United States Patent [19]

Vereschagin et al.

[11] 4,138,252
[45] Feb. 6, 1979

[54] CUBIC BORON NITRIDE IN A BINDER AND METHOD FOR ITS PRODUCTION

[76] Inventors: Leonid F. Vereschagin, Kutuzovsky prospekt, 2/1, kv. 231; Aik A. Semerchian, Kutuzovsky prospekt, 2/1, kv. 205, both of Moscow; Tamara T. Gankevich, Podolsky raion, Akademgorodok, ulitsa Shkolnaya, 6, kv. 16, Moskovskaya oblast; Mikhail E. Dmitriev, Podolsky raion, Akademgorodok, ulitsa Shkolnaya, 4, kv. 64, Moskovskaya oblast; Vitaly P. Modenov, Podolsky raion, Akademgorodok, ulitsa Tsentralnaya, 10, kv. 42, Moskovskaya oblast, all of U.S.S.R.

[21] Appl. No.: 805,310

[22] Filed: Jun. 10, 1977

[51] Int. Cl.$^2$ .............................................. C22C 29/00
[52] U.S. Cl. ........................................ 75/244; 75/205; 75/226
[58] Field of Search ........................... 75/244, 205, 226

[56] References Cited

U.S. PATENT DOCUMENTS

| | | | |
|---|---|---|---|
| 2,888,738 | 6/1959 | Taylor | 75/244 |
| 3,047,938 | 8/1962 | Dega | 75/244 |
| 3,574,579 | 4/1971 | Clarke | 75/244 |

FOREIGN PATENT DOCUMENTS 453442  7/1973  U.S.S.R. .................................... 75/244

OTHER PUBLICATIONS

Zhivov et al. Porosh Met. (USSR) No. 1 Jan. 1970.

Primary Examiner—Brooks H. Hunt
Attorney, Agent, or Firm—Steinberg & Blake

[57] ABSTRACT

The invention relates to a compact containing crystals of cubic boron nitride and a binder containing at least one of the intermetallic compounds selected from the group consisting of $Ti_2Cu$, Ti, Cu, $Ti_2Cu_3$, $TiCu_3$, $Zr_2Cu$, ZrCu, $Zr_2Cu_3$, and $ZrCu_3$. A method for the production of this compact comprises the steps of forming a composition including crystals of cubic boron nitride and a binder containing at least one of the intermetallic compounds selected from the group consisting of $Ti_2Cu$, TiCu, $Ti_2Cu_3$, $TiCu_3$, $Zr_2Cu$, ZrCu, $Zr_2Cu_3$, and $ZrCu_3$, and subjecting the obtained composition of cubic boron nitride and the binder to a pressure within the range of 10 to 50 kilobars and a temperature within the range of 1,000° C. to 1,400° C. The advantage of the present invention consists in providing a simple method for the production of the compact which possesses retained strength and cutting properties. The compact of the invention may be most advantageously used for making cutting and grinding tools intended for machining iron-, nickel-, and cobalt-base steels and alloys.

7 Claims, No Drawings

CUBIC BORON NITRIDE IN A BINDER AND METHOD FOR ITS PRODUCTION

The present invention relates to superhard materials and methods for their production and, more particularly, to cubic boron nitride campacts and methods for producing these materials.

The term "compacts" is used herein to denote the materials based on superhard components, such as diamond or cubic boron nitride, which are obtained by subjecting these components to high pressures and temperatures.

These compacts may be most advantageously used as the abrading medium in various cutting and grinding tools intended for maching iron-, nickel-, and cobalt-base steels and alloys.

There is known a cubic boron nitride compact in which the crystals are joined by a bonding medium. The bondig medium in this compact contains at least one of the metals or metal oxides selected from the group consisting of W, Ni, Be, Re, Ti, Zr, Cr, Co, $Al_2O_3$, BeO, Mo, Mn, and Cu.

The afore-said compact is used in tools for machining heat-treated steels and exhibits high cutting properties.

A method for producing this compact consists in subjecting crystals of cubic boron nitride and a binder to the effects of pressure and temperature. In view of the fact that the binders employed for this compact have high melting points, the method for producing the compact involves the use of high temperatures (from 1500° C. to 2300° C.) and high pressures (from 50 to 90 kilobars). To provide these operating conditions, complicated equipment and high-skilled labor are needed.

The disadvantage of both the compact and the method for making the same lies in that the produced compact is small, in size amounting to several cubic centimetres, which is due to limited volume of working chambers of such apparatus which are capable of providing the required high pressures and temperatures.

The principal object of the present invention is to provide a cubic boron nitride compact having high strength and cutting properties and requiring low temperatures and pressures for its production.

Another object of the invention is to provide said compact and method for its production which allow the use of simpler equipment and, accordingly, less skilled labour for its production as compared to the known equipment used for similar purposes.

Still another object of the invention is to provide a method for the production of a compact, which method allows a large-size compact to be obtained exceeding in size similar compacts made by known methods.

SUMMARY OF THE INVENTION

The invention essentially contemplates the provision of a compact containing crystals of cubic boron nitride and a binder, said binder containing according to the invention, at least one of the intermetallic compounds selected from the group consisting of $Ti_2Cu$, $TiCu$, $Ti_2Cu_3$, $TiCu_3$, $Zr_2Cu$, $ZrCu$, $Zr_2Cu_3$, and $ZrCu_3$.

It is known that the aforecited intermetallic compounds used as binders have, unlike other metallic binders used for similar purpose, low melting points (1200° C.) and high strength properties. In addition, the softening-to-melting points ratio in said compounds is close to unity ($\approx$ 0.8–0.9), hence having a high heat resistance.

Owing to such properties, these intermetallic compounds are used in conjunction with cubic boron nitride for the production of a compact.

Because of the high softening-to-melting points ratio in the intermetallic compounds, the proposed compact shows high heat resistance.

The presence of the aforesaid intermetallic compounds in the compact requires lower temperatures and pressures for its production than those needed for the production of other compacts; therefore both the necessary equipment and the production process are simplified.

Moreover, lower process parameters make it possible to considerably increase the size of the compact to be obtained, namely up to tens of cubic centimetres.

It is most preferable that the compact should comprise at least one of the intermetallic compounds selected from the group consisting of $Ti_2Cu$, $TiCu$, $Ti_2Cu_3$, $TiCu_3$, $Zr_2Cu$, $ZrCu$, $Zr_2Cu_3$, and $ZrCu_3$, said compounds being present in a quantity of 10 to 35 percent by volume, and cubic boron nitride as the balance.

A content larger than 35 percent by volume of said intermetallic compounds in the present compact causes it to have decreased hardness, and a content smaller than 10 percent by volume of said compounds leads to increased brittleness, which results in deteriorated cutting properties of the compact.

It is expedient in accordance with a preferred embodiment of the invention that the compact contains at least one of the alloying components selected from the group consisting of V, Cr, Nb, Mo, Ta, W, Fe, Co, Ni, and Mn, said components being present in quantity equal to at least 50 percent of the total weight of said intermetallic compounds.

It has been proved that the compact with the above alloying components is best suited to machining hardened steels.

It has been discovered that the aforesaid properties of the compact of the invention show up best with the following combination of its components, in percent by volume:

cubic boron nitride — 80 to 90,
intermetallic compounds — 8 to 16,
alloying additives — 2 to 4.

These and other objects of to the invention are accomplished by the provision of a method for the production of the compact, comprising the steps of preparing a composition including crystals of cubic boron nitride and a binder, and subjecting the obtained composition to the effects of pressure and temperatures.

Here, according to the invention, at least one of the intermetallic compounds selected from the group consisting of $Ti_2Cu$, $TiCu$, $Ti_2Cu_3$, $TiCu_3$, $Zr_2Cu$, $ZrCu$, $Zr_2Cu_3$, and $ZrCu_3$ is used as the binder, the obtained composition of cubic boron nitride crystals and the binder being subjected to a pressure within the range of 10 to 50 kilobars and a temperature within the range of 1000° C. to 1400° C.

The above intermetallic compounds used as the binder for bonding together the crystals of cubic boron nitride make it possible to considerably decrease the process parameters in the production of the compact. The melting points of these compounds lie within the range of from 1000° C. to 1400° C., and the pressures used range from 10 to 50 kilobars. These "soft" process parameters in the reaction vessel of a pressure apparatus determine low pressure and temperature gradients, thus providing more homogenous structure and uniform properties of the compact throughout its volume, as well as highly reproducible results of the process.

To obtain compacts of high strength and wear resistance, the binder should be placed in close proximity to the crystals of cubic boron nitride without being mixed therewith.

Under the effect of temperature and pressure the binder so disposed is melted to impregnate compacted crystals of cubic boron nitride.

Here, the spatial lattice formed by the crystals of cubic boron nitride under the effect of high pressure remains unchanged, whereas the binder is disposed in the voids between these crystals, which results in high strength of the compact. During the melting of the binder the impurities are forced out to the periphery of the compact being produced, hence which results in uniform properties of the compact throughout its volume.

Where it is necessary to machine hardened steels, at least one of the alloying components selected from the group consisting of V, Cr, Nb, Mo, Ta, W, Fe, Co, No, and Mn may be added to the binder.

The present invention will now be described in detail by way of example.

There is proposed a cubic boron nitride compact whose crystals are bonded by a binder. In accordance with the invention, the binder comprises at least one of the intermetallic compounds selected from the group consisting of $Ti_2Cu$, $TiCu$, $Ti_2Cu_3$, $TiCu_3$, $Zr_2Cu$, $ZrCu$, $Zr_2Cu_3$, and $ZrCu_3$, taken singly or in combination. These compounds account for 10 to 35 percent by volume of the compact, and the crystals of cubic boron nitride account for the balance.

The compact of the invention has high strength and cutting properties and, therefore is intended for use in cutting and abrasive tools for machining iron-, nickel-, and cobalt-base steels and alloys.

According to the invention, the compact includes in addition to said compoonents, at least one of the alloying components selected from the group consisting of V, Cr, Nb, Mo, Ta, W, Fe, Co, Ni, and Mn, said components being present in quantity equal to at least 50 percent of the total weight of said intermetallic compounds. Such a compact is suitable for machining hardened steels.

The invention further provides a method for the production of the compact wherein crystals of cubic boron nitride and a binder are placed in a graphite vessel. This composition is then subjected to the pressure and temperature effects herein set forth. According to the invention, intermetallic compounds selected from the group consisting of $Ti_2Cu$, $TiCu$, $Ti_2Cu_3$, $TiCu_3$, $Zr_2Cu$, $ZrCu$, $Zr_2Cu_3$, and $ZrCu_3$ are used as the binder, the obtained composition containing the cubic boron nitride crystals and the intermetallic compounds being subjected to a pressure within the range of 10 to 50 kilobars and to a temperature within the range of 1000° C. to 1400° C.

According to the invention, the binder is then disposed in close proximity to the crystals of cubic boron nitride without being mixed therewith. The binder may overlie as well as underlie the cubic boron nitride crystals and may also be placed beside the same. Here, it is essential that the binder be disposed on the periphery of the volume taken by the crystals of cubic boron nitride.

Owing to such a disposition, the spatial lattice formed by the crystals of cubic boron nitride under the effect of high pressure remains unchanged. When melted, the binder pentrates the voids between the crystals of cubic boron nitride, thus finding these crystals.

The compact and the method for its production have been experimentally proved to possess substantial advantages over know similar compacts and methods.

EXAMPLE 1

Crystal particles of cubic boron nitride with a size of 10 $\mu$ are placed in a graphite vessel.

Placed in the same vessel is a binder, in this case intermetallic compounds $Ti_2Cu$.

The binder is used in the form of a briquette made of pressed chips of copper-titanium intermetallic compound $Ti_2Cu$. The weight of the cubic boron nitride crystals and the bonding medium is 2 grams each.

The binder is disposed in the vessel so as to overlie the crystals of cubic boron nitride.

The loaded vessel is placed in a pressure chamber of a known apparatus for the production of a compact from cubic boron nitride.

The crystals of cubic boron nitride are sintered with the binder at a pressure of 15 kilobars and at a temperature of 1200° C. for over one minute. The produced compact contains 70 percent by volume of cubic boron nitride and 30 percent by volume of the binder ($Ti_2Cu$) and is suitable for use in various cutting tools for machining iron-, nickel-, and cobalt, based steels and alloys.

EXAMPLE 2

A compact with crystal particles of cubic boron nitride having a size of 7 $\mu$ is made in a manner similar to that set forth in Example 1. A mixture of intermetallic compounds $Ti_2Cu$ + $TiCu$ present in the ratio 3:1 is used as the binder. The respective weights of the crystals of cubic boron nitride and the binder are 2 and 2.5 grams. The crystals of cubic boron nitride are sintered with the binder at a pressure of 20 kilobars and a temperature of 1150° C. for over one minute.

The produced compact contains 80 percent by volume of cubic boron nitride and 20 percent by volume of the binder ($Ti_2Cu$ + $TiCu$) and is suitable for use in various cutting tools for machining iron-, nickel-, and cobalt-base steels and alloys.

EXAMPLE 3

A binder such as a mixture of intermetallic compounds $Zr_2Cu$ present $ZrCu$ in the ratio 2:1 with additives V and Cr is placed in a graphite vessel. The binder is used in the form of a birquette made of pressed chips of the copper-zirconium intermetallic compounds with additives V and Cr. Crystal particles of cubic boron nitride having a size of 5 $\mu$ are then placed in the same vessel. The content of the cubic boron nitride crystals is 1.5 grams and the bonding medium, 2.5 grams, the latter including 0.5 grams of V and 0.5 grams of Cr.

The binder is disposed in the vessel so as to lie under the crystals of cubic boron nitride and in contact therewith.

The loaded vessel is placed in a pressure chamber of a known apparatus for processing a compact from cubic boron nitride.

The sintering is carried out at a pressure of 40 kilobars and a temperature of 1300° C. for over one minute.

The produced compact contains 85 percent by volume of cubic boron nitride and 15 percent by volume of the bonding medium ($Zr_2Cu$ + $ZrCu$ with V and Cr) and is suitable for use in various cutting tools intended to machine iron-, nickel-, and cobalt-base steels and alloys.

EXAMPLE 4

A compact with crystal particles of cubic boron nitride having a size of 5 $\mu$ and a binder such as a mixture consisting of $Ti_2Cu + TiCu + Ti_2Cu_3$ in the ratio 4:2:1 and additives Co, Mn and Cr is made in a manner similar to that set forth in Example 3.

The cubic boron nitride crystals and the binder each account for 3 grams, the binder including 0.8 grams of Co, 0.4 grams of Mn, and 0.2 grams of Cr.

The crystals of cubic boron nitride are sintered with the binder at a pressure of 35 kilobars and a temperature of 1350° C. for over one minute.

The produced compact contains 90 percent by volume of cubic boron nitride and 10 percent by volume of the binder ($Ti_2Cu + TiCu + TiCu_3$ with Co, Mn and Cr) and is suitable for use in various cutting tools intended to machine iron-, nickel, and cobalt-base steels and alloys.

EXAMPLE 5

A compact with crystal particles of cubic boron nitride having a size of 120 $\mu$ and a binder such as a copper-titanium compound $TiCu_3$ with additives Ni and Nb is made in the manner set forth in Example 3. The content of the cubic boron nitride crystals and the binder is 2 and 3 grams, respectively, the binder containing 1 gram of Ni and 0.4 gram of Nb.

The crystals of cubic boron nitride are sintered with the binder at a pressure of 10 kilobars and a temperature of 1100° C. for over 30 sec.

The produced compact contains 65 percent by volume of cubic boron nitride and 35 percent by volume of the binder ($TiCu_3$ with Ni and Nb) and is suitable for use in various abrasive tools intended to machine iron-, nickel-, and cobalt-base steels and alloys.

What is claimed is:

1. A compact composed of crystals of cubic boron nitride sintered to a binder containing at least one of the intermetallic compounds selected from the group consisting of $Ti_2Cu$, $TiCu$, $Ti_2Cu_3$, $Ti Cu_3$, $Zr_2Cu$, $ZrCu$, $Zr_2Cu_3$, and $ZrCu_3$.

2. The compact of claim 1, containing in percent by volume:
   at least one of the intermetallic compounds selected from the group consisting of

| Tihd 2Cu, TiCu, $Ti_2Cu_3$, $TiCu_3$, $Zr_2Cu$, ZrCu, $Zr_2Cu_3$, and $ZrCu_3$ | −10 to 35, |
|---|---|
| and cubic boron nitride, | the balance. |

3. The compact of claim 1, and also including at least on alloying component selected from the group consisting of V, Cr, Nb, Mo, Ta, W, Fe, Co, Ni, and Mn in a quantity equal to at least 50 percent of the total weight of said intermetallic compounds.

4. The compact material of claim 3, which contains in percent by volume:

| Cubic boron nitride | −80 to 90; |
|---|---|
| at least one of the intermetallic compounds selected from the group consisting of $Ti_2Cu$, TiCu, $Ti_2Cu_3$, $TiCu_3$ $Zr_2Cu$, ZrCu, $Zr_2Cu_3$, and $ZrCu_3$ | −8 to 16; |
| at least one of the alloying components selected from the group consisting of V, Cr, Nb, Mo, Ta, W, Fe, Co, Ni, and Mn | −2 to 4. |

5. Method of producing a compact, which comprises subjecting a composition comprising cubic boron nitride and a binder containing at least one of the intermetallic compounds selected from the group consisting of $Ti_2Cu$, TiCu, $Ti_2Cu_3$, $TiCu_3$, $Zr_2Cu$, ZrCu, $Zr_2Cu_3$, and $ZrCu_3$, to a combined pressure of 10 to 50 kilobars and a temperature of 1000° C. to 1400° C., thereby sintering said cubic boron nitride to said intermetallic compound to form a compact of high strength and cutting properties.

6. The method of claim 5, wherein the binder is disposed in close proximity to the crystals of cubic boron nitride without being mixed therewith.

7. The method of claim 5, wherein at least one of the alloying components selected from the group consisting of V, Cr, Nb, Mo, Ta, W, Fe, Co, Ni, and Mn is added to the binder.

* * * * *